Nov. 23, 1937.  S. G. DALEN ET AL  2,099,972

ELECTRIC GENERATOR

Filed July 22, 1935

INVENTORS
Sten Gunnar Dalen
BY Emil Einar Wilhelm Anderson
David C. Marble
their ATTORNEY.

Patented Nov. 23, 1937

2,099,972

UNITED STATES PATENT OFFICE 2,099,972

ELECTRIC GENERATOR

Sten Gunnar Dalén and Emil Einar Wilhelm Andersen, Stockholm, Sweden, assignors to Aga-Baltic Radio Aktiebolag, Stockholm, Sweden, a corporation of Sweden Application July 22, 1935, Serial No. 32,474
In Sweden July 28, 1934

14 Claims. (Cl. 171—209)

Our invention relates to electric generators and more particularly to electric generators designed especially for use in connection with bicycles, motorcycles or other vehicles.

Especially in connection with bicycles, which travel at a comparatively slow rate of speed, difficulty has been experienced in constructing a generator which will develop sufficient voltage for the purposes desired, such as supplying current for lighting and operating warning signals. The voltage developed by a generator is dependent upon the relative speeds of the rotating parts and upon the size of these parts. An increase in either the speed or the size increases the voltage. Heretofore, it has been the practice to drive the generator by means of a friction roller engaging the tire of the bicycle wheel, inasmuch as the tire rotates at the greatest peripheral speed of any part of a bicycle. This requires that the generator be located in a more or less exposed position and hence subject to damage.

One of the objects of our invention is to construct a generator which may be placed wholly within the hub of a bicycle wheel. The space available within a hub is limited and hence it is necessary to drive the generator parts at high relative speeds in order that the desired voltage may be produced. In accordance with our invention special gearing is provided which causes the parts to rotate at a sufficiently high speed to give the desired voltage.

Further objects and advantages will be apparent from the following specification considered in connection with the accompanying drawing which forms a part of the specification and of which:

Figure 1:
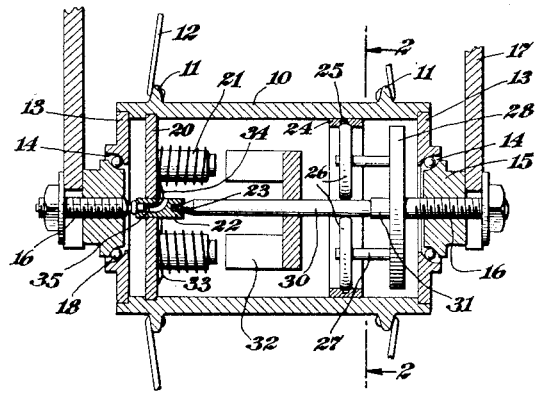
Fig. 1 is a cross-sectional view of an embodiment of our invention and is taken on the line 1—1 of Fig. 2.

Referring more particularly to Fig. 1, reference character 10 designates a preferably cylindrical member forming a portion of the hub of a wheel for a bicycle, motorcycle or the like. The exterior of member 10 is provided with apertured projections 11 which are engaged by the inner ends of wire spokes 12 in the usual manner. Annular end plates 13 are secured to member 10 and are formed with a bearing race 14. The other race of each bearing is formed on a bearing member 15 fixed on a stationary stub shaft 16, which in turn is rigidly secured to the frame of the vehicle 17, such as the fork of a bicycle. Ball bearings 18 are provided between members 13 and 15 and serve to rotatably mount the hub 10 on the stationary shafts 16.

Fixed within member 10 is a spider or disc 20 to which is secured a plurality of armature windings 21. A bearing member 22 is secured to the center plate 20 and is provided at its inner end with a conical recess 23.

A ring member 24 is secured within member 10 and is preferably formed with a groove 25 having a rectangular cross-section. A plurality of wheels or rollers 26 are mounted on shafts 27 fixed to a stationary plate or spider 28. Plate 28 is rigidly secured to the inner end of stub shaft 16. Rollers 26 frictionally engage the groove 25 of member 24 and the contact surfaces of these rollers are preferably circular so that they engage member 24 only at the edges of groove 25. Rollers 26 also frictionally engage a shaft 30, and serve also as roller bearings for supporting one end of the shaft. The other end of shaft 30 is formed with a conical point which is received in conical recess 23, thereby serving to rotatably support this end of the shaft. Axial movement of shaft 30 is prevented by a thrust block 31 carried by plate 28. The field of the generator is mounted on shaft 30, and in the embodiment shown, constitutes permanent magnets 32.

Armature coils 21 are connected in series and one of the electrical leads 33 is grounded to some metallic part of the hub while the other lead 34 passes through an opening 35 formed by bearing member 22 and is connected to a contact pin 36 carried by member 22. A brush 37 is slidably mounted in an insulating sleeve 39 secured within a bore 38 formed in stub shaft 16 at the left-hand end of the hub, as viewed in Fig. 1, and is pressed against the pin 36 by means of a spring 40. The other end of the spring bears against or is secured to a contact member 41 fixed in bore 38, to which may be connected an electric conductor, which may pass within the tubular frame 17. This structure is shown in detail in Fig. 3, the larger scale of which makes possible the clearer illustration.

The operation of the above described device is as follows:

Rotation of the wheel of course causes rotation of member 10 and armature coils 21 rotate therewith and at the same speed. Ring 24 also rotates with the hub and causes rollers 26, which engage the ring internally, to rotate in the same direction. Rotation of rollers 26 cause rotation of shaft 30, which they engage externally, to take place in the opposite direction from that of the member 10. The speed ratio between member 10 and shaft 30 is equal to the ratio of the internal diameter of ring 24 to the external diameter of shaft 30. The rollers 26 do not affect the speed ratio but do serve to reverse the direction of rotation. Rotation of shaft 30 causes magnets 32 to rotate. The field magnets rotate in a direction opposite to that of the armature coils and hence the relative speed of rotation between the armature and the field is equal to the sum of their absolute speeds of rotation. This gives a relative speed higher than that which would be obtained if either the armature or the field were stationary.

The relative rotation between the armature and field generates an electric current in the armature windings in well-known manner and this current is led therefrom through the leads 33 and 34. Lead 33 being grounded this side of the circuit is completed through the frame of the bicycle, while the other side is completed through contact pin 36, brush 37, spring 40 and contact member 41.

Figure 2:
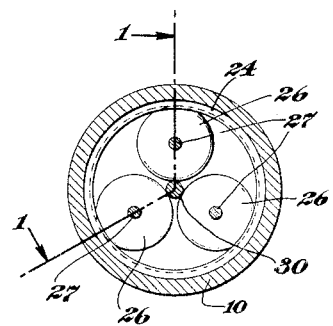
Fig. 2 is a cross-sectional view taken on the line 2—2 of Fig. 1.
Figure 3:
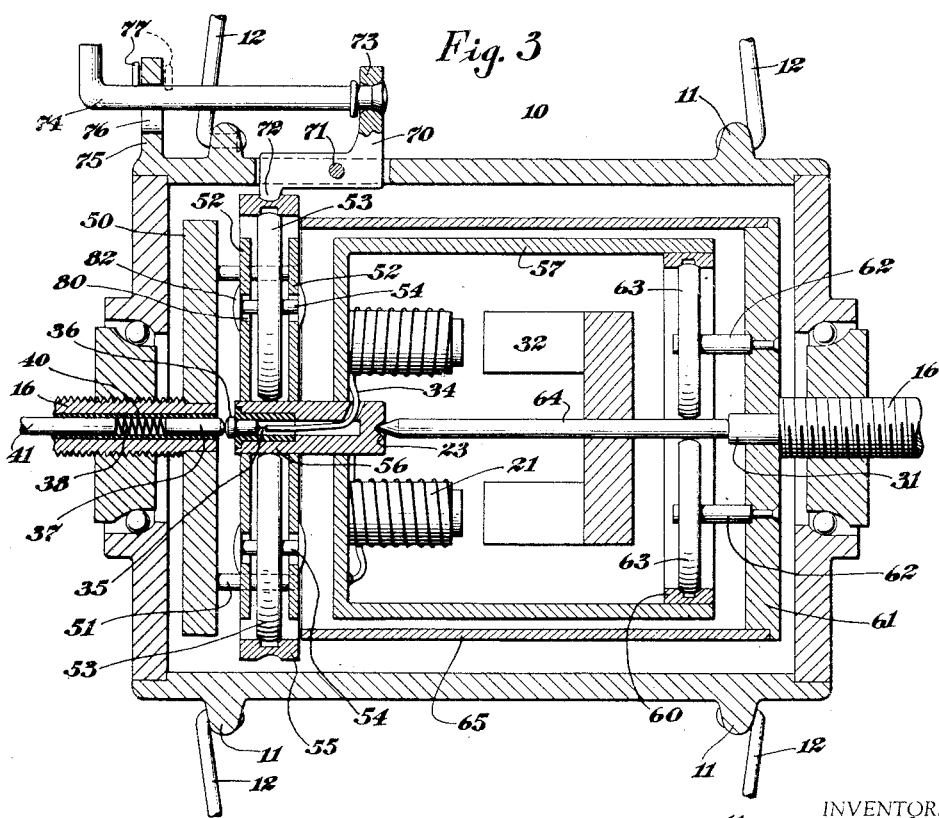
Fig. 3 is a cross-sectional view of another embodiment.

If the relative speed of the armature and field is not sufficiently high with the arrangement above described to generate the desired voltage, a much higher speed may be obtained with the arrangement shown in Fig. 3 without materially increasing the dimension of the generator. In this embodiment similar reference characters designate parts similar to those shown in Fig. 1. Rigidly mounted on the inner end of the left-hand stub shaft 16 is a spider or plate 50. Pins 51 are secured to plate 50 and serve to space and support parallel discs 52. Wheels or rollers 53 are mounted on shafts 54 extending between discs 52. A ring 55 is internally engaged by rollers 53. Ring 55 is preferably formed with a groove similar to groove 25 shown in Fig. 1 and, if desired, may be made of resilient material so as to better engage the rollers 53. A shaft 56 extends through the openings formed in the center of discs 52 and is externally engaged by rollers 53. These rollers, as well as serving to drive shaft 56, act also as roller bearings for supporting the shaft. Preferably, one or more of the rollers 53 may be mounted on a floating shaft so that the elasticity of ring 55 may serve to press the roller against shaft 56. Consequently, one or more of the shafts 54 is received in holes 80 in plates 52, which holes are of larger diameter than that of the shaft so as to permit radial displacement of the latter. The floating shaft is provided with heads 82 larger than holes 80 so as to prevent axial displacement of the shaft. A cylindrical casing 57 is rigidly secured to shaft 56. Armature windings 21 are fixed within member 57. A ring 60 is mounted within the open end of member 57 and is provided with an internal groove. A spider or plate 61 is rigidly secured to the inner end of the right-hand stub shaft 16 and supports shafts 62 upon which are rotatably mounted a plurality of rollers 63. Rollers 63 engage ring 60 internally and serve as a roller bearing support therefor. The armature assembly, including shaft 56, member 57, ring 60 and coils 21, is hence rotatably supported at one end by rollers 53 and at the other end by rollers 63. Rollers 63 also engage a shaft 64 externally. Shaft 64 corresponds to shaft 30, shown in Figs. 1 and 2, and is supported at one end by the rollers and at the other by having its pointed end received in conical recess 23 in shaft 56. Thrust block 31 prevents axial movement of shaft 64. Field elements 32 are mounted on shaft 64. If desired, a cylindrical casing 65 may be supported by plate 61 to form a closure for the rotating parts of the generator.

Current is led from the armature windings 21 in the same manner as that disclosed in connection with the first embodiment.

In order that the generator may be disconnected when no current is required, ring 55 is not permanently secured to cylindrical member 10. To effect such a connection, a catch member 70 is pivoted at 71 within a slot formed in member 10. One end of member 70 is provided with a detent 72 which may engage one of a series of recesses formed in the outer face of ring 55 so as to lock the ring with member 10 for rotation therewith. The other end of member 70 is provided with an arm 73 which extends radially outward between spokes 12. In order that member 70 may be readily manipulated, a rod or the like 74 is rotatably secured to arm 73 and extends axially outside of the spokes. A retaining member 75 is secured to the hub and formed with an aperture through which rod 74 extends. A bayonet slot 76 communicates with the aperture and a pin 77 is secured to rod 74. With the rod in the position shown in Fig. 3 pin 77 engages the left side of member 75, as viewed in the figure, and detent 72 is held in engagement with ring 55. In order to release the detent, rod 74 is rotated until pin 77 is in alignment with slot 76, whereupon the rod is moved axially, the pin passing through the slot. This causes member 70 to pivot slightly in a clockwise direction, thus moving detent 72 out of engagement with ring 55. Rod 74 is then rotated to bring pin 77 out of alignment with slot 76 and the rod is consequently held in this position.

The operation of this embodiment is as follows:

With rod 74 in the position shown in Fig. 3, the detent 72 on member 70 engages ring 55 and consequently causes the ring to rotate with the member 10. This rotation causes rollers 53 to rotate in the same direction and to rotate shaft 56 in the opposite direction and at a higher speed than the speed of the hub. Rotation of shaft 56 causes similar rotation of member 57, to which are secured armature coils 21 and ring 60. The rotation of ring 60 in turn causes rollers 63 to rotate in the same direction, which causes rotation of shaft 64 in a direction opposite to that of member 57 and at a still higher speed. Consequently field elements 32 are caused to rotate in a direction opposite to that of armature coils 21. Inasmuch as armature coils 21 rotate at a higher speed than that of the hub, the relative speed of rotation between the armature and the field is high. Hence, a high voltage is generated although the field and armature elements are comparatively small.

It will be seen that the gearing employed in this embodiment is made up of two stages connected together in series. The first stage comprises the ring 55, rollers 53 and shafts 56, while the second stage comprises the ring 60, rollers 63 and shaft 64. The field elements are mounted to rotate with the last step of the last stage, while the armature elements rotate with the last step of the next-to-the-last stage. When there are only two stages, obviously the next-to-the-last stage is also the first stage. However, if still higher relative speeds are desired more than two stages of gearing may be employed.

Instead of employing friction rollers, toothed gearing might be used. However, frictional rollers are cheaper, quieter in operation and serve better as roller bearings for the central shafts which they support, than would toothed gearing. In the appended claims, however, the term "gearings" is used in its broadest sense and is intended to cover all types of rotary motion transmitting mechanism.

An advantage of the embodiment shown in Fig. 3 resides in the fact that the electric generator and the gearing constitute a separate unit which may be assembled and tested before being placed within the hub. Hence, they also may be removed as a unit for purposes of repair.

The embodiments shown in Figs. 1 and 2 may, if desired, be provided with disengaging mechanism similar to that shown in Fig. 3, but has been omitted from the drawing for the sake of simplicity. Likewise, while permanent magnets have been shown as field elements, obviously ordinary field coils could be employed in conjunction with the usual slip rings for transmitting current thereto. Also, a well-known commutator could be employed if a direct current output were desired.

While we have shown two more or less specific embodiments of our invention, this has been done for purposes of illustration only and the scope of our invention is not to be limited thereby, but only by the appended claims viewed in the light of the prior art.

What we claim is:

1. An electric generator including a first rotatable member, a second rotatable member mounted within and concentric with said first member, a plurality of rotatably mounted wheels internally engaging said first member and externally engaging said second member for transmitting rotary motion between said members, said first member being resilient so as to frictionally engage said wheel, at least one of said wheels being mounted on a floating shaft to permit radial displacement of the wheel, an armature element mounted on one of said members, and a field element mounted on the other of said members in operative relation with said armature element.

2. An electric generator including a first rotatable member, a second rotatable member mounted within said first member, a pair of parallel fixed annular plates disposed radially between said members, a plurality of shafts extending between said plates, rotatable wheels supported by said shafts, said wheels internally engaging said first member and externally engaging said second member for transmitting rotary motion between said members, an armature element mounted on one of said members, and a field element mounted on the other of said members in operative relation to said armature element.

3. An electric generator including a first rotatable member having an inner surface formed with an annular groove the opposite sides of said groove forming edges with said inner surface, a second rotatable member mounted within said first member, a rotatably mounted wheel having a contact surface curved in axial direction internally engaging said first member at the edges of said groove and externally engaging said second member for transmitting rotary motion between said members, an armature element mounted on one of said members, and a field element mounted on the other of said members in operative relation with said armature element.

4. In a device of the class described, a hollow member forming a wheel hub, an electric generator within said hub including armature and field elements mounted to rotate with respect to each other and with respect to said hub, and means for driving said elements at a speed higher than that of said hub.

5. In a device of the class described, a hollow member forming a wheel hub, an electric generator within said hub including armature and field elements mounted to rotate with respect to each other and with respect to said hub, means for driving one of said elements at a speed higher than that of said hub, and means for driving the other of said elements in a reverse direction from that of said one of said elements.

6. In a device of the class described, a hollow member forming a wheel hub, an electric generator within said hub including armature and field elements mounted to rotate with respect to each other and with respect to said hub, means for driving one of said elements at a speed higher than that of said hub, and means for driving the other of said elements in a reverse direction from, and at a higher speed than, that of said one of said elements.

7. In a device of the class described, a hollow member forming a wheel hub, a plurality of stages of rotary motion transmitting mechanism within said hub connected in series and driven by said hub, each of said stages including a gear train, and an electric generator including rotatably mounted armature and field elements, one of said elements being connected for rotation with the last gear of the train included in the last stage and the other of said elements being connected for rotation with the last gear of the train included in next to the last stage.

8. In a device of the class described, a hollow member forming a wheel hub, a plurality of stages of rotary motion transmitting mechanism within said hub connected in series and driven by said hub, each of said stages including an internal gear driving a shaft through an idler wheel, and an electric generator including rotatably mounted armature and field elements, one of said elements being connected for rotation with the shaft included in the last stage, and the other of said elements being connected for rotation with the shaft included in the next to the last stage.

9. In a device of the class described, a hollow member forming a wheel hub, a plurality of stages of rotary motion transmitting mechanism within said hub connected in series and driven by said hub, each of said stages including a gear train, and an electric generator including rotatably mounted armature and field elements, one of said elements being connected for rotation with the last gear of the train included in the last stage and the other of said elements being connected for rotation with the last gear of the train included in next to the last stage, said last gears being connected for rotation in opposite directions.

10. In a device of the class described, a hollow member forming a wheel hub, a plurality of stages of rotary motion transmitting mechanism within said hub connected in series and driven by said hub, each of said stages including an internal gear driving a shaft through an idler wheel, and an electric generator including rotatably mounted armature and field elements, one of said elements being connected for rotation with the shaft included in the last stage, and the other of said elements being connected for rotation with the shaft included in the next to the last stage, said shafts being connected for rotation in opposite directions.

11. In a device of the class described, a hollow member forming a wheel hub, a plurality of stages of rotary motion transmitting mechanism within said hub and connected in series, each of said stages including a gear train, an electric generator including rotatably mounted armature and field elements, one of said elements being connected for rotation with the last gear of the train included in the last stage and the other of said elements being connected for rotation with the last gear of the train included in next to the last stage, and means for selectively coupling the first gear of the first train to said hub for rotation therewith.

12. In a device of the class described, a hollow member forming a wheel hub, spokes secured to said hub, a plurality of stages of rotary motion transmitting mechanism within said hub and connected in series, each of said stages including a gear train, an electric generator including rotatably mounted armature and field elements, one of said elements being connected for rotation with the last gear of the train included in the last stage and the other of said elements being connected for rotation with the last gear of the train included in next to the last stage, and means including a manipulating member extending axially beyond said spokes for selectively coupling the first gear of the first train to said hub for rotation therewith.

13. In a device of the class described, a hollow member forming a wheel hub, rotary motion transmitting mechanism within said hub including a gear train, an electric generator including rotatably mounted armature and field elements, one of said elements being connected for rotation with the last gear of said train and the other of said elements being connected for rotation with a gear of said train which rotates in a direction opposite from said last gear, and means for selectively coupling said gear train to said hub.

14. In a device of the class described, a hollow member forming a wheel hub, a first rotatable member, means for coupling said first member to said hub for rotation therewith, a second rotatable member arranged in said hub, a plurality of wheels engaging said first member and said second member for transmitting rotary motion between said members, a third rotatable member arranged in the interior of said second member, a plurality of wheels engaging said second member and said third member for transmitting rotary motion from said second member to said third member, an armature mounted on one of said rotatable members and a field element mounted on another of said rotatable members.

STEN GUNNAR DALÉN.
EMIL EINAR WILHELM ANDERSON.